United States Patent
Sun et al.

(10) Patent No.: US 8,933,962 B2
(45) Date of Patent: Jan. 13, 2015

(54) CLIPART CARTOON TECHNIQUES

(75) Inventors: Jian Sun, Beijing (CN); Ying-Qing Xu, Beijing (CN); Litian Tao, Beijing (CN); Mengcheng Huang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 258 days.

(21) Appl. No.: 12/946,675

(22) Filed: Nov. 15, 2010

(65) Prior Publication Data

US 2012/0120097 A1   May 17, 2012

(51) Int. Cl.
| | | |
|---|---|---|
| G09G 5/00 | (2006.01) | |
| G06T 13/00 | (2011.01) | |
| G06K 9/00 | (2006.01) | |
| G06K 9/36 | (2006.01) | |
| G06F 17/30 | (2006.01) | |
| G06T 11/00 | (2006.01) | |
| G06T 11/60 | (2006.01) | |

(52) U.S. Cl.
CPC ........ G06F 17/30265 (2013.01); G06T 11/001 (2013.01); G06T 11/60 (2013.01)
USPC ........... 345/619; 345/620; 345/629; 345/634; 345/646; 345/473; 382/165; 382/170; 382/181; 382/282; 382/284; 707/769

(58) Field of Classification Search
None
See application file for complete search history.

(56) References Cited

U.S. PATENT DOCUMENTS

| | | | | |
|---|---|---|---|---|
| 5,751,286 | A * | 5/1998 | Barber et al. ................. | 715/835 |
| 7,010,546 | B1 * | 3/2006 | Kolawa et al. ................ | 707/694 |
| 7,486,296 | B2 | 2/2009 | Yao | |
| 7,487,145 | B1 * | 2/2009 | Gibbs et al. ........................... | 1/1 |
| 2002/0006224 | A1 | 1/2002 | Wong | |
| 2008/0200191 | A1 | 8/2008 | Rao et al. | |
| 2009/0135198 | A1 | 5/2009 | Lee et al. | |
| 2009/0154841 | A1 | 6/2009 | Choi et al. | |
| 2009/0252413 | A1 | 10/2009 | Hua et al. | |
| 2009/0252435 | A1 | 10/2009 | Wen et al. | |
| 2009/0297024 | A1 | 12/2009 | Dai | |
| 2010/0156919 | A1 * | 6/2010 | Bala et al. ...................... | 345/582 |
| 2010/0293185 | A1 * | 11/2010 | Rosado et al. ................ | 707/769 |

OTHER PUBLICATIONS

Jiazheng Shi and Stephen E. Reichenbach, "Image Interpolation by Two-Dimensional Parametric Cubic Convolution", IEEE Transactions on Image Processing, vol. 15, No. 7, Jul. 2006, pp. 1857-1870.*

Bitouk, et al., "Face Swapping: Automatically Replacing Faces in Photographs", retrieved on Aug. 2, 2010 at <<http://www.cs.columbia.edu/CAVE/projects/face_replace/>>, ACM, Transactions on Graphics, Aug. 2008, pp. 1-3.

Canny, "A Computational Approach to Edge Detection", retrieved on Apr. 8, 2009 at <<http://www.limsi.fr/Individu/vezien/PAPIERS_ACS/canny1986.pdf>>, IEEE Transactions on Pattern Analysis and Machine Intelligence (PAMI), vol. 8, No. 6, Nov. 1986, pp. 679-698.

(Continued)

*Primary Examiner* — Tize Ma
(74) *Attorney, Agent, or Firm* — Dan Choi; Judy Yee; Micky Minhas

(57) ABSTRACT

Techniques for generating a personalized cartoon by using a few text queries are described herein. The present disclosure describes efficiently searching multiple images from a network, obtaining clipart image from the multiple images, and vectorization of the clipart image. The present disclosure also describes techniques to change a style of the cartoon such as recoloring one or more cartoon objects.

20 Claims, 12 Drawing Sheets

(56) References Cited

OTHER PUBLICATIONS

Chen, et al., "EasyToon: An Easy and Quick Tool to Personalize a Cartoon Storyboard Using Family Photo Album", retrieved on Aug. 2, 2010 at <<http://www.cs.cmu.edu/yuandong/acmmm08.pdf>>, ACM, Proceedings of International Multimedia Conference (MM), Vancouver, Canada, Oct. 2008, pp. 499-508.

Chen, et al., "PicToon: A Personalized Image-based Cartoon System", retrieved on Aug. 2, 2010 at <<http://citeseerx.ist.psu.edu/viewdoc/download?doi=10.1.1.90.6465&rep=rep1&type=pdf>>, ACM, Proceedings of International Conference on Multimedia, Juan-les-Pins, France, Dec. 2002, pp. 171-178.

Chen, et al., "Sketch2Photo: Internet Image Montage", retrieved on Aug. 2, 2010 at <<http://www.ece.nus.edu.sg/stfpage/eletp/Papers/sigasia09_sketch2photo.pdf>>, ACM Transactions on Graphics (TOG), vol. 28, No. 5, Article 124, Dec. 2009, pp. 1-10.

Cohen-Or, et al., "Color Harmonization", retrieved on Aug. 2, 2010 at <<http://cs.nyu.edu/sorkine/ProjectPages/Harmonization/harmonization.pdf>>, ACM Transactions on Graphics (TOG), vol. 25, No. 3, Jul. 2006, pp. 624-630.

Dori, et al., "Sparse Pixel Vectorization: An Algorithm and Its Performance Evaluation", retrieved on Aug. 3, 2010 at <<http://ieeexplore.ieee.org/stamp/stamp.jsp?tp=&arnumber=754586&userType=inst>>, IEEE Transactions on Pattern Analysis and Machine Intelligence, vol. 21, No. 3, Mar. 1999, pp. 202-215.

Duda and Hart's Pattern Classification and Scene Analysis, John Wiley and Sons, pp. 271-272, 1973.

Fogarty, et al., "CueFlik: Interactive Concept Learning in Image Search", retrieved on Aug. 2, 2010 at <<http://www.cs.washington.edu/homes/jfogarty/publications/chi2008-cueflik.pdf>>, ACM, Proceeding of Conference on Human Factors in Computing Systems (CHI), Florence, Italy, Apr. 2008, pp. 29-38.

Hays, et al., "Scene Completion Using Millions of Photographs", retrieved on Aug. 2, 2010 at <<http://graphics.cs.cmu.edu/projects/scene-completion/scene-completion.pdf>>, ACM SIGGRAPH, San Diego, CA, Aug. 2007, pp. 1-7.

Hilaire, et al., "Robust and Accurate Vectorization of Line Drawings", retrieved on Aug. 3, 2010 at <<http://ieeexplore.ieee.org/stamp/stamp.jsp?tp=&arnumber=1624354>>, IEEE Transactions on Pattern Analysis and Machine Intelligence, vol. 28, No. 6, Jun. 2006, pp. 890-904.

Hsu, et al., "Skeletal Strokes", retrieved on Aug. 2, 2010 at <<http://citeseerx.ist.psu.edu/viewdoc/download?doi=10.1.1.112.9076&rep=rep1&type=pdf>>, ACM, Proceedings of Symposium on User Interface Software and Technology, Atlanta, Georgia, 1993, pp. 197-206.

Ianeva, "Detecting Cartoons: A Case Study in Automatic Video-genre Classification", retrieved on Aug. 2, 2010 at <<http://www.uv.es/tzveta/invwork.pdf>>, University of Valencia, Ph.D. Research, 2003, pp. 1-178.

Jeschke, et al., "A GPU Laplacian Solver for Diffusion Curves and Poisson Image Editing", retrieved on Aug. 2, 2010 at <<http://www.public.asu.edu/pwonka/Publications/2009.SGA.Jeschke.LaplacianSolver.final.pdf>>, ACM, Proceedings of International Conference on Computer Graphics and Interactive Techniques, Yokohama, Japan, 2009, pp. 1-8.

Jeschke, et al., "Rendering Surface Details with Diffusion Curves", retrieved on Aug. 3, 2010 at <<http://www.cg.tuwien.ac.at/research/publications/2009/jeschke-09-rendering/>>, ACM Transaction on Graphics, Yokohama, Japan, Dec. 2009, vol. 28, No. 5, pp. 1-8.

Johnson, et al., "Semantic Photo Synthesis", retrieved on Aug. 2, 2010 at <<http://mi.eng.cam.ac.uk/reports/svr-ftp/brostow_Eurographics06.pdf>>, University of Cambridge, Technical Report 20060422MJ, Apr. 22 2006, pp. 1-9.

Koller, et al., "Multiscale Detection of Curvilinear Structures in 2-D and 3-D Image Data", retrieved on Aug. 2, 2010 at <<http://citeseerx.ist.psu.edu/viewdoc/download;jsessionid=5B9EAB1046E66E9E96A8FFA4861148C8?doi=10.1.1.20.3072&rep=rep1&type=pdf>>, IEEE Computer Society, Proceedings of International Conference on Computer Vision (ICCV), 1995, pp. 1-6.

Kurlander, et al., "Comic Chat", retrieved on Aug. 2, 2010 at <<http://citeseerx.ist.psu.edu/viewdoc/download?doi=10.1.1.94.7434&rep=rep1&type=pdf>>, ACM, Proceedings of Conference on Computer Graphics and Interactive Techniques, 1996, pp. 225-236.

Lai, et al., "Automatic and Topology-Preserving Gradient Mesh Generation for Image Vectorization", retrieved on Aug. 2, 2010 at <<http://citeseerx.ist.psu.edu/viewdoc/download?doi=10.1.1.154.1933&rep=rep1&type=pdf>>, ACM Transactions on Graphics (TOG), vol. 28, No. 3, Aug. 2009, pp. 1-8.

Lalonde, et al., "Photo Clip Art", retrieved on Aug. 3, 2010 at <<http://graphics.cs.cmu.edu/projects/photoclipart/>>, ACM Transactions on Graphics (SIGGRAPH), Aug. 2007, vol. 26, No. 3, pp. 1-4.

Lecot, et al., "Ardeco: Automatic Region DEtection and COnversion", retrieved on Aug. 2, 2010 at <<http://alice.loria.fr/publications/papers/2006/EGSR_Ardeco/EGSR_ardeco.pdf>>, The Eurographics Association, Eurographics Symposium on Rendering, 2006, pp. 1-12.

Liu, et al., "Intrinsic Colorization", retrieved on Aug. 3, 2010 at <<http://www.cse.cuhk.edu.hk/ttwong/papers/incolor/incolor.html>>, ACM, International Conference on Computer Graphics and Interactive Techniques, Singapore, 2008, pp. 1-2.

Madden, et al., "The effect of a computer-based cartooning tool on children's cartoons and written stories", Elsevier Science Ltd. Oxford, Computers and Education, vol. 51, No. 2, Sep. 2008, pp. 900-925.

OMalley, "New search-by-style options for Google Image Search", retrieved on Aug. 3, 2010 at <<http://googleblog.blogspot.com/2008/12/new-search-by-style-options-for-google.html>>, Google Inc., The Official Google Blog, Dec. 2008, pp. 1-4.

Orzan, et al., "Diffusion Curves: A Vector Representation for Smooth-Shaded Images", retrieved on Aug. 2, 2010 at <<http://artis.imag.fr/Publications/2008/OBWBTS08/diffusion_curves.pdf>>, ACM Transactions on Graphics (TOG), vol. 27, No. 3, Aug. 2008, pp. 1-8.

Price, et al., "Object-based vectorization for interactive image editing", Springer-Verlag, Visual Computer, vol. 22, Aug. 2006, pp. 661-670.

Ryu, et al., "CINETOON: A Semi-Automated System for Rendering Black/White Comic books from Video Streams", retrieved on Aug. 3, 2010 at <<http://ieeexplore.ieee.org/stamp/stamp.jsp?tp=&arnumber=4568526&userType=inst>>, IEEE Computer Scoeity, International Conference on Computer and Information Technology Workshops, 2008, pp. 336-341.

Shapira, et al., "Image Appearance Exploration by Model-Based Navigation", retrieved on Aug. 2, 2010 at <<http://www.cs.tau.ac.il/liors/research/papers/image_appearance_exploration.pdf>>, EUROGRAPHICS Computer Graphics Forum, vol. 28, No. 2, 2009, pp. 629-638.

Snavely, et al., "Photo Tourism: Exploring Photo Collections in 3D", retrieved on Aug. 2, 2010 at <<http://citeseerx.ist.psu.edu/viewdoc/download?doi=10.1.1.62.910&rep=rep1&type=pdf>>, ACM, International Conference on Computer Graphics and Interactive Techniques, Boston, Massachusetts, 2006, pp. 835-846.

Sun, et al., "Image Vectorization using Optimized Gradient Meshes", retrieved on Aug. 2, 2010 at <<http://citeseerx.ist.psu.edu/viewdoc/download?doi=10.1.1.91.3300&rep=rep1&type=pdf>>, ACM Transactions on Graphics, vol. 26, No. 3, Article 11, Jul. 2007, pp. 1-8.

Swaminarayan, et al., "Rapid Automated Polygonal Image Decomposition", IEEE Computer Society, Applied Image Pattern Recognition Workshop, 2006, pp. 1-6.

Sykora, et al., "Sketching Cartoons by Example", retrieved on Aug. 2, 2010 at <<http://moon.felk.cvut.cz/sykorad/Sykora05-SBM.pdf>>, The Eurographics Association, Eurographics Workshop on Sketch-Based Interfaces and Modeling, 2005, pp. 1-8.

Tao, et al., "SkyFinder Attribute-based Sky Image Search", retrieved on Aug. 2, 2010 at <<http://research.microsoft.com/en-us/um/people/jiansun/papers/skyfinder_siggraph09.pdf>>, ACM, International Conference on Computer Graphics and Interactive Techniques, New Orleans, Louisiana, 2009, pp. 1-5.

C. Tomasi and R. Manduchis Bilateral Filtering for Gray and Color Images, Proceedings of the Sixth International Conference on Computer Vision, 839-846, 1998.

(56) References Cited

OTHER PUBLICATIONS

Vapnik, "The Nature of Statistical Learning Theory", retrieved on Jul. 31, 2009 at <<http://cscs.umich.edu/crshalizi/reviews/vapnik-nature/>>, Springer-Verlag Berlin, 1995, The Bactra Review, May 1999, pp. 1-2.

Xia, et al., "Patch-Based Image Vectorization with Automatic Curvilinear Feature Alignment", ACM Transactions on Graphics (SIGGRAPH Asia), vol. 28, No. 5, Article 115, Dec. 2009, pp. 1-10.

Zhang, et al., "Vectorizing Cartoon Animations", retrieved on Aug. 2, 2010 at <<http://ralph.cs.cf.ac.uk/papers/Geometry/CartoonVectorization.pdf>>, IEEE Transactions on Visualization and Computer Graphics, vol. 15, No. 4, Jul. 2009, pp. 618-629.

Zhu, et al., "A Fuzzy Quantization Approach to Image Retrieval Based", Proceedings of the 3rd International Conference on Ubiquitous Information Management and Communication (ICUIMC), Suwon, S. Korea, 2009, pp. 141-149.

Zou, et al., "Skeletonization of Ribbon-Like Shapes Based on Regularity and Singularity Analyses", retrieved on Aug. 3, 2010 at <<http://ieeexplore.ieee.org/stamp/stamp.jsp?tp=&arnumber=931528&userType=inst>>, IEEE Transactions on Systems, Man, and Cybernetics, Part B, vol. 31, No. 3, Jun. 2001, pp. 401-407.

* cited by examiner

US 8,933,962 B2

CLIPART CARTOON TECHNIQUES

BACKGROUND

A picture is worth a thousand words. A cartoon is one kind of picture that generally represents a simplistic and unrealistic portrayal of a scene or figure. The cartoon can use a few simple figures to effectively tell a story and convey emotion.

However, it can be difficult to manually draw even a simple cartoon because it requires considerable artistic skills. In addition, to prepare a cartoon with assistance of computer often requires a mastery of complicated software such as Adobe Illustrator or Flash. Such artistic and technical skills create a barrier for many users to prepare a cartoon by themselves. Techniques for easily creating personalized cartoons would therefore be valuable to such users.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the present disclosure.

The present disclosure describes techniques for facilitating a user to search, filter, edit, and compose a clipart-based cartoon. Techniques described herein enable the user to search a plurality of images from a local database or internet by the user's intuitive input of a few keywords, similar to a text search, and to select a desired clipart image after filtering out unqualified images. The clipart image thus obtained is automatically converted into a vector-based representation. With a vectorized clipart image, the techniques enable the user to interactively edit, stylize, and composite a personalized cartoon. Some or all techniques herein can also be used to create a general picture without limitation to cartoon.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Overview

Figure 1:
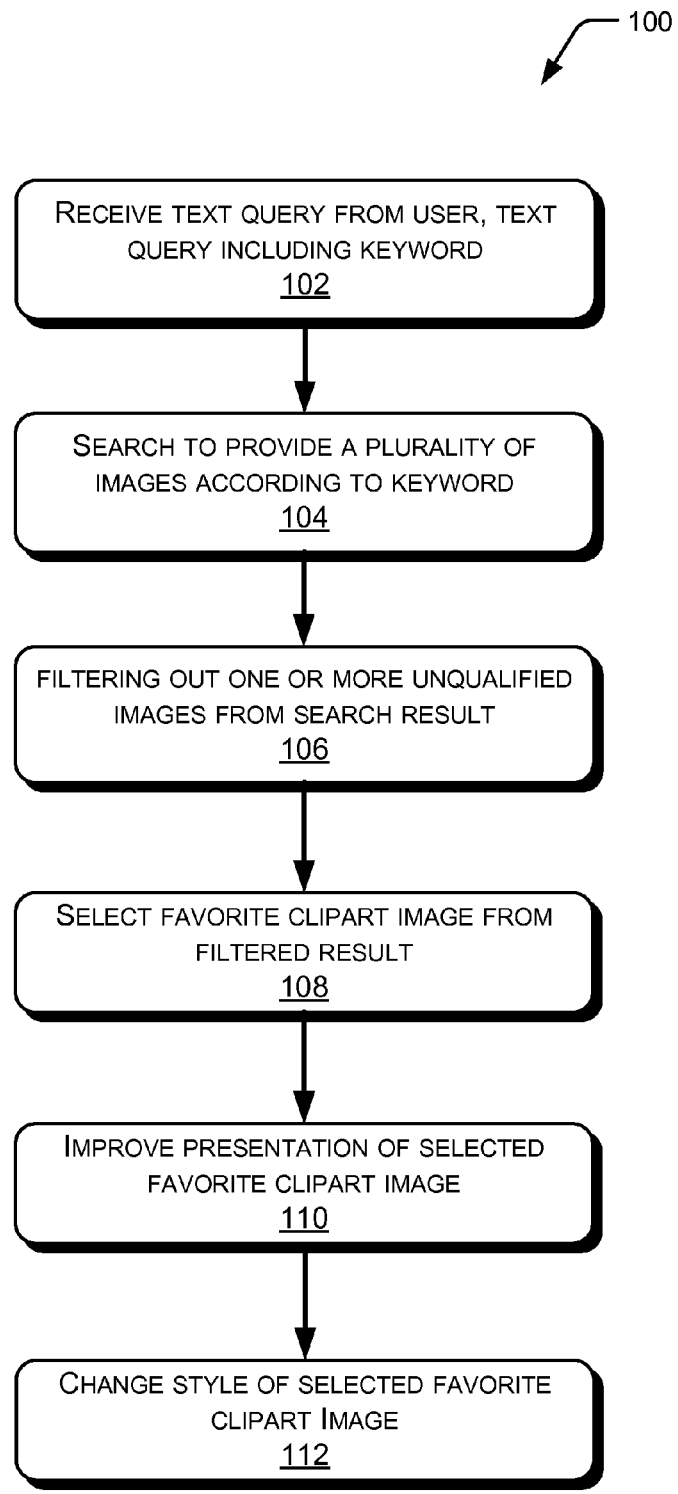
FIG. 1 illustrates an exemplary method for creating a cartoon in accordance with the present disclosure.

FIG. 1 illustrates an exemplary method 100 for creating a cartoon. In method 100 of FIG. 1, an action 102 comprises receiving a text query including a keyword from a user. The text query specifies a location and content of a respective cartoon object on the cartoon. For example, when the user inputs a keyword "bag," the respective cartoon object should be an image of a bag. The user can also specify the location of the cartoon object on the cartoon by placing a text box of the text query on a background of the cartoon.

An action 104 comprises searching to provide a plurality of images according to the keyword. A search can be conducted by a search engine, such as Bing, to search the plurality of images at a local database, an intranet, or an internet, by using the keyword as a search query. In order to obtain more useful and richer results, the keyword input by the user can be automatically expanded for the search query. For example, action 104 can include an action comprising adding the keyword input by the user with another keyword such as "cartoon" or "clipart."

Action 104 can also include an action comprising specifying a characteristic of an image that the user desires and wants the search engine to limit the search result to the image with the characteristics. For example, the characteristics includes but not limited to a size or precision of the image, a color of the image such as black and white or full color, and a style of the image. The style can be a color, line style, texture, or shape of the image.

To provide better user experience, method 100 may further include an action comprising pre-downloading images corresponding to a number of commonly used keywords to the local database. Such number, for instance, can be 2,000. Such pre-downloaded image can be updated periodically according to one or more preset rules. For example, method 100 may include an action comprising re-searching a plurality of images from the internet according to a plurality of commonly used keywords at certain time every day when the search engine is not busy, and downloading the plurality of images to the local database.

An action 106 comprises filtering out one or more unqualified images from the plurality of images, i.e. the search result, to obtain one or more clipart images as a filtering result. In one embodiment, a desired image for the cartoon is a clipart image that includes black strokes and regions with uniform color on a simple background. The other images of the search results are thus considered unqualified images. This type of clipart image can be easily automatically determined and selected. Thus the definition of such desired image simplifies the task of filtering non-clipart images. Such type of clipart image is also "vectorization-friendly" for vectorization of the clipart image in another action for easy editing and style changing of the cartoon.

An action 108 comprises selecting a favorite clipart image from a filtered search result. For example, those images that remain after filtering are presented to the user for browsing and selection of the favorite image. In another example, the favorite image can be automatically selected according to one or more preset rules.

Method 100 may further include an action 110 comprising improving the presentation of the selected favorite clipart image. Such improvement includes but is not limited to vectorizing the favorite image to produce a vector representation of the image.

Method 100 may also include an action 112 comprising changing the style of the selected favorite clipart image. For example, such change can be a change of the color, line style, texture, or shape of the selected image.

Figure 2:
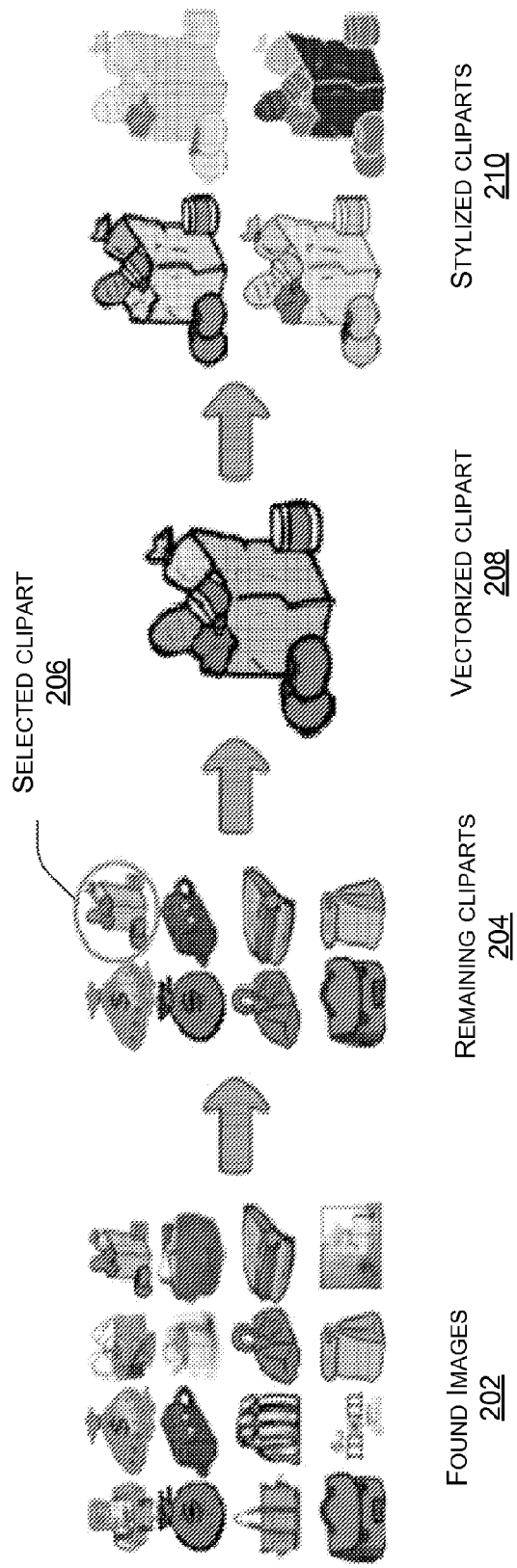
FIG. 2 illustrates an exemplary search, filter, vectorization, and stylization by using a text query "bag" as an example in accordance with the present disclosure.

FIG. 2 illustrates an exemplary search, filter, vectorization, and stylization based on a text query "bag" as an example. In this example, the user inputs the keyword "bag" in the text query. Picture 202 shows a result of multiple images of bags found during the search and returned by the search engine with the keyword "bag" as the search query. The found images include both unqualified images and qualified clipart images. Picture 204 shows the remaining clipart images of bags after the unqualified images have been filtered out. Picture 206 shows a selected clipart image of bag which is highlighted by a circle. Picture 208 shows the selected clipart image of bag after vectorization. Picture 210 shows four stylized clipart images of bag by changing the style of the vectorized clipart of picture 208. These four images are substantially the same as the clipart image in picture 208 but have different styles, such as different colors and different line styles as shown in picture 210.

A cartoon created by the technique described above may include a plurality of cartoon objects, each corresponding to a text query. By iterating the above method for different text queries, the user can easily create a personalized vectorized-cartoon by searching and composing multiple clipart objects.

Some or all of the above techniques can be used or modified in creating a general picture not limited to a cartoon. The picture can include multiple objects, such as a photo, a logo, or text, without restriction to clipart images.

Text Query

FIGS. 3A-3C illustrate exemplary text queries input by the user to create the cartoon.

FIG. 3A shows a user interface 300 of a computing system through which a user can type a text query for each cartoon object, such as a text query 302, and specify its location and content on a cartoon canvas 304.

FIG. 3A uses text query 302 as an example to show components of a text query. Text query 302 includes a text box 306, which is shown in white color in FIG. 3A, to specify a location, a size, and a shape of a respective cartoon object to be created on cartoon canvas 304, and a keyword 308 input by the user to describe the respective cartoon object. In the example of text query 302, the location of text box 306 is at the top-left corner of canvas background 304 and the shape of textbox 306 is a square. Keyword 308 is "smiling cloud" input by the user. Text query 302 thus specifies that the respective cartoon object representing a smiling cloud will appear at the location of text box 306 in the cartoon to be created. In the example of text query 302, the size of text box 306 also determines the size of the respective cartoon object that should be substantially the same size of text box 306. In other words, the cartoon creator system may maintain an original shape of the respective cartoon object found by the search engine, and automatically and proportionately enlarge or reduce the size of the respective cartoon object to fit the size of text box 306. The shape of text box 306 may also affect the shape of the respective cartoon object. For example, when the cartoon creator system searches a plurality of images to find the respective cartoon object, an image with the same or similar shape as that of text box 306 will have a high ranking in the search result. In another example, the cartoon creator system may deform the respective cartoon object to fit in the shape of text box 306. It is also appreciated that the shape of text box 306 may be irrelevant to the respective cartoon object in some other examples.

In one embodiment, any of the location, size, and shape of text box 306 can be adjusted by the user. For example, the user can drag text box 306 to move text query 302 to another location or adjust the size or shape of text box 306 on cartoon canvas 304.

There is a plurality of methods that the user can input text query 302 on cartoon canvas 304. For example, the user can use a mouse to select an area as text box 306 on cartoon canvas 304, then type keyword 308 "smiling cloud" into text box 306. In another example, the user can drag and drop text box 306 from another portion of user interface 300 onto cartoon canvas 304.

Cartoon canvas 304 is a background of the cartoon to be created. There can be a plurality of methods to create and present cartoon canvas 304 on user interface 300. For example, cartoon canvas 304 can be selected by the user from a plurality of cartoon canvases (not shown) provided by the cartoon creator system or can be randomly provided by the cartoon creator system by default. The user inputs one or more text queries on cartoon canvas 304 to tell a story that the user intends the cartoon to represent.

Figure 3:
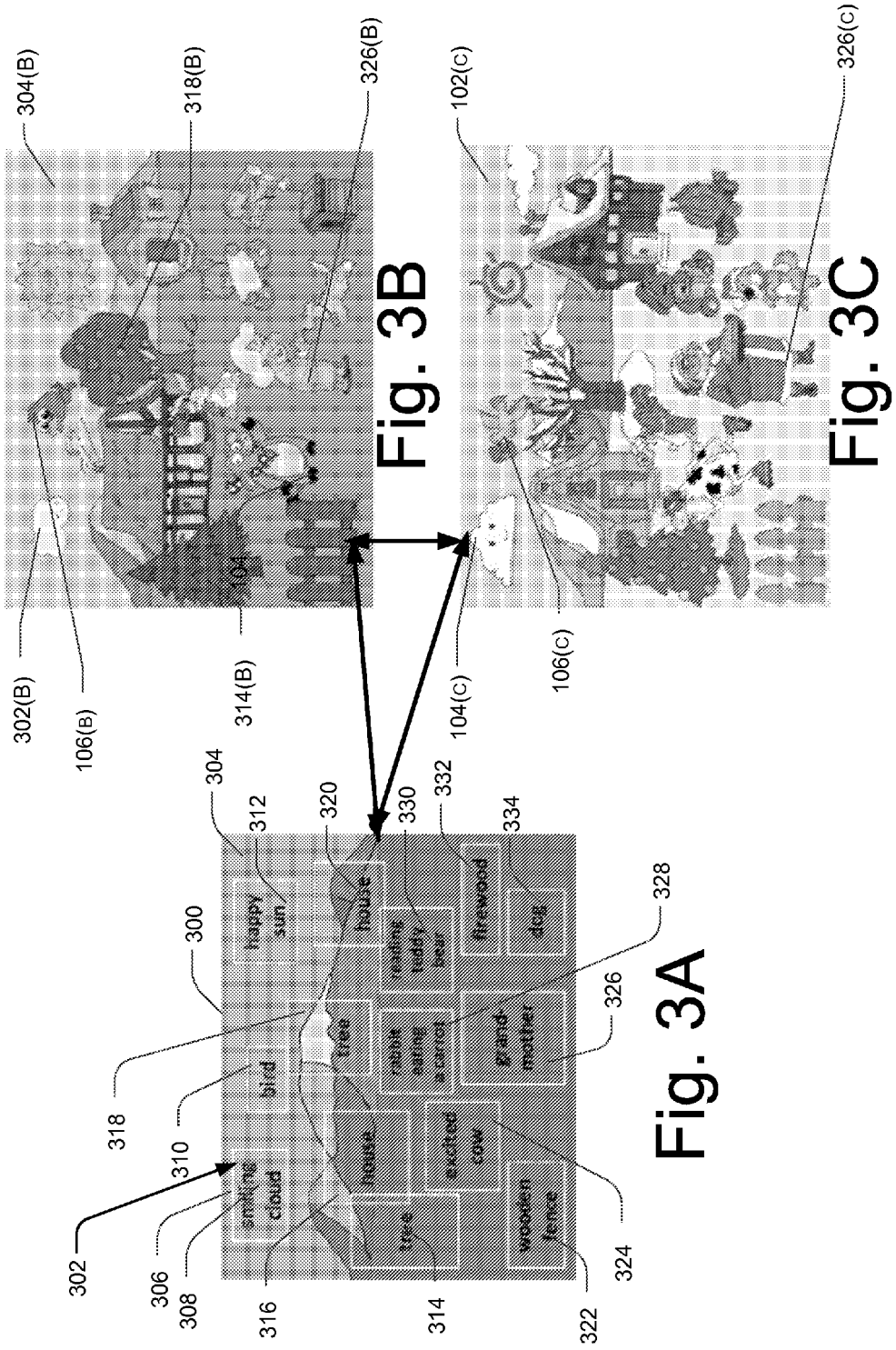
FIGS. 3A-3C illustrate exemplary text queries input by the user to create the cartoon in accordance with the present disclosure.

Generally, the cartoon includes more than one cartoon object to effectively tell a story. For example, in FIG. 3, the user intends to prepare a cartoon to show a scenario that a grandmother plays with multiple pets before her house. The user can place a plurality of text queries, as shown in FIG. 3A, on cartoon canvas 304, and arrange their sizes and locations according to the user's imagination of the cartoon to be created. The text queries, in the example of FIG. 3A, include text query 302 "smiling cloud," a text query 310 "bird," a text query 312 "happy sun," a text query 314 "tree," a text query 316 "house," a text query 318 "tree," a text query 320 "house," a text query 322 "wooden fence," a text query 324 "excited cow", a text query 326 "grandmother," a text query 328 "rabbit eating a carrot," a text query 330 "reading teddy bear," a text query 332 "firewood," and a text query 334 "dog."

In the example of FIG. 3, the input text queries are free styles and there are no restrictions on the keywords input by the user. For example, the keyword can be a simple noun such as text query 310 "bird" and text query 334 "dog." The keyword can also describe the cartoon object in more details, such as text query 302 "smiling cloud" which uses an adjective "smiling" to modify the noun "cloud." The keyword can also more accurately describe the carton object, such as the text query 328 "rabbit eating a carrot" which uses a clause "eating a carrot" to describe a carton object and its action. In other words, the keyword can be a noun, a phrase, or a sentence. There is no limit to the keyword and the user may only need to consider searchability of the keyword by the search engine if the keyword is too long or too complicated.

For each text query, the cartoon creator system searches, filters, selects, and improves the cartoon object by implementing above described method 100.

FIG. 3B shows an exemplary cartoon composed by favorite clipart images corresponding to respective text queries. In the example of FIG. 3B, cartoon canvas 304(B) is the same as cartoon canvas 304. At a corresponding location of text query 302 "smiling cloud" in FIG. 3A, there is a clipart image 302(B) representing a smiling cloud in FIG. 3B. At a corresponding location of text query 310 "bird" in FIG. 3A, there is an image 310(B) representing a bird in FIG. 1B. In the interest of brevity, unless provided otherwise, numberings of clipart images representing other text queries in FIG. 3A are not shown in the FIG. 3B and FIG. 3C below. By iterating a presentation of a clipart image for each text query on cartoon canvas 304(B), a personalized cartoon is generated in FIG. 3B. Even though keywords are the same for two or more text queries, clipart images corresponding to the two or more text queries are not necessarily the same and can be different. For example, text query 314 and text query 318 in FIG. 3A both include the same keyword "tree." Clipart image 314(B) and clipart image 318(B), however, show two different clipart images in FIG. 3(B).

There can be different methods in selecting clipart images for all text queries of FIG. 3A. In one example, the user can select the favorite clipart image one text query after another. In another example, especially when the number of text queries is high, the user may not want to choose all images by himself/herself which requires more time and higher artistic skills to coordinate styles of the images. The cartoon creator system can automatically select the other images based on styles of one or more images selected by the user. For example, the user selects clipart image 326(B) for 326 text query "grandmother." The cartoon creator system analyzes the style of clipart image 326 (B), and automatically selects the other clipart images for the other text queries based on the analyzed style of image 326 (B). In yet another example, the cartoon creator system may automatically select all favorite images based on one or more preset rules. If the user is not satisfied with an automatically selected clipart image or cartoon canvas, the user can then manually select a different clipart image.

FIG. 3C shows another cartoon using the same text queries in FIG. 3A. It shows that the same text queries can produce different cartoons based on selection of cartoon objects or canvas background. The user can manually select different clipart images and canvas background in FIG. 3C. Alternatively, the user only needs to change the cartoon canvas or one or more clipart images. The cartoon creator system may automatically select the remaining clipart images or canvas background.

FIG. 3C shows a different cartoon canvas 304(C) from cartoon canvas 304 and carton canvas 304(B). Cartoon canvas 304(C) is substantially the same as cartoon canvas 304 but has a different style, which is different color in this example, from cartoon canvas 304. The color of cartoon canvas 304(C) is mainly white, which implies a winter time. The user may manually select clipart images complying with an implication of cartoon canvas 304(C). For example, the user selects a clipart image 326(C) in which a grandmother is in Christmas dress that is typically more suitable for the winter time.

Such selection of clipart images to comply with the cartoon canvas or even other clipart images is time-consuming and usually requires high artistic skills. The cartoon creator system may automatically conduct such selection. For example, the cartoon creating system analyzes the style of the cartoon canvas 304(c) to automatically select corresponding clipart images that are in line with the style of the cartoon canvas 304(c) based on an analysis result. The cartoon creator system can also analyze the style of one or more clipart images selected by the user, such as clipart image 326(C), to select the other clipart images or canvas background 304 (C).

Both FIG. 3B and FIG. 3C can be directly derived from FIG. 3A based on text queries in FIG. 3A. The user can also obtain FIG. 3C based on FIG. 3B or vice versa.

For example, the user can change cartoon canvas 304(B) to cartoon canvas 304(C) or change a clipart image 326(B) grandmother in FIG. 3B to a different clipart image 326(C) in FIG. 3C. The user can change clipart images in FIG. 3B one by one to convert them into the cartoon presented in the FIG. 3C. For convenience or other considerations, the user may only change one clipart image such as clipart image 326(C). The cartoon creator system will automatically select the other images by analyzing clipart image 326(C).

As cartoon canvas 304(C) has a style of white color and clipart image 326(C) "grandmother" is in Christmas clothing, the cartoon creator system can analyze the contents or styles of cartoon canvas 304(C) or clipart image 326(C) to obtain the other clipart images in FIG. 3C.

FIG. 3B can also be converted from FIG. 3C by using the same techniques described above.

Clipart Filtering

Figure 4:
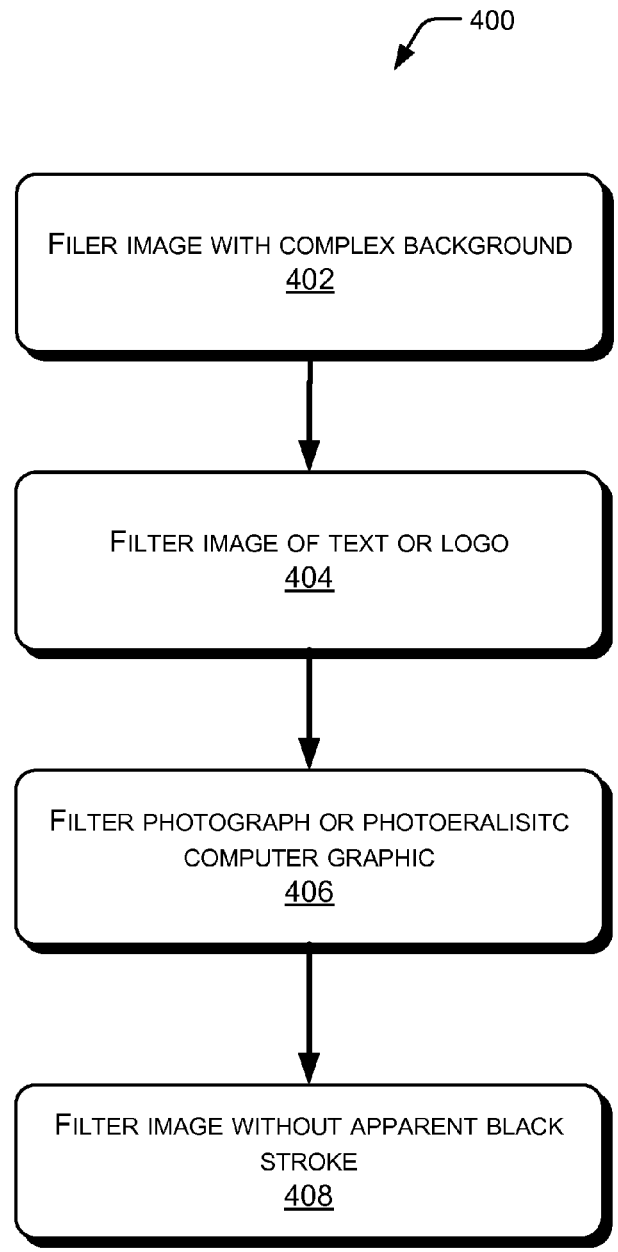
FIG. 4 illustrates an exemplary detailed method for an action filtering unqualified images from a search result in accordance with the present disclosure.

FIG. 4 illustrates an exemplary detailed method 400 for action 106 of filtering unqualified images from the search result in method 100.

As described above, in this embodiment, the desired image after filtering is the clipart image that includes black strokes and regions with uniform color on a simple background.

In this embodiment, the unqualified images include a non-clipart image, such as a text or a logo, an image with a complex background, a photograph or a photorealistic computer graphic, an image without apparent black strokes, or a combination thereof.

An action 402 comprises filtering the image with the complex backgrounds. For example, an image in the search result is quantized from 256×256×256 RGB colors to 16×16×16 RGB colors. For four regions (24×24 pixels) of the image corners, action 402 further comprises determining whether each corner region has a dominant color (for example 90% of the pixels are the same). If a number of corner regions sharing the same dominant color is higher than a threshold such as 3, the image is a simple background image; if not, the image is regarded as having a complex background and is thus filtered.

For a simple background image, method 400 may further include an action comprising computing a foreground mask by using techniques such as a flood-fill algorithm seeded from the dominant color of the corners.

An action 404 comprises filtering the image of text or logo. Generally, the shape of the clipart image is much simpler than the text or logo image. To utilize such characteristics to filter the text or logo image, for example, action 404 may further comprise computing a shape complexity score of the foreground mask, and filtering the image with a shape complexity score higher than a threshold, such as 50 for example.

The complexity score c is defined as $$c = T^2/4\pi A$$

where T and A are a perimeter and an area of the foreground mask, respectively.

An action 406 comprises filtering the photograph or the photorealistic computer graphic. The photo or photorealistic computer graphic tends to have a shading, which results in many small-magnitude gradients. Action 406 can utilize such feature to filter the photograph or photorealistic computer graphic. Action 406 may further comprise training a support vector machine (SVM) classifier by using a gradient magnitude histogram (such as with 10 bins) as a feature. The SVM classifier can be obtained in accordance with technologies such as those described in Vapnik, The Nature of Statistical Learning Theory, Springer-Vertag, 1995. The classifier is trained from a number of clipart images and photos, such as 500 clipart images and 500 photos, that are manually labeled as clipart images or photos. Action 406 may further comprise filtering an image whose SVM score is smaller than a threshold. The threshold, for instance, can be 0.5 set up by the user or by default in the cartoon creator system.

An action 408 comprises filtering the image without the apparent black stroke. For example, action 408 may further comprise computing a black stroke score that is a ratio of the number of strong edge pixels that have neighboring black pixels over the number of all strong edge pixels. Action 408 may also comprise filtering an image with a ratio small than a threshold such as 50%. Such image does not have obvious black strokes.

The strong edge is regarded as an edge whose response of a Sobel edge operator higher than a threshold such as 0.1. The number of neighboring pixels is 8 in one example. For the black pixel, its intensity should be smaller than a threshold such as 20. Such edge detection can be obtained in accordance with technologies such as those described in Canny's A Computational Approach to Edge Detection, *IEEE Trans. Pattern Anal. March Intell*, 8, 6, 1986, and Duda and Hart's Pattern Classification and Scene Analysis, John Wiley and Sons, 271-2, 1973.

The plurality of images in the search result is filtered to obtain one or more qualified clipart images for each text query. The filtering process can be performed when the cartoon creator system downloads the plurality of images from the internet.

Figure 5:
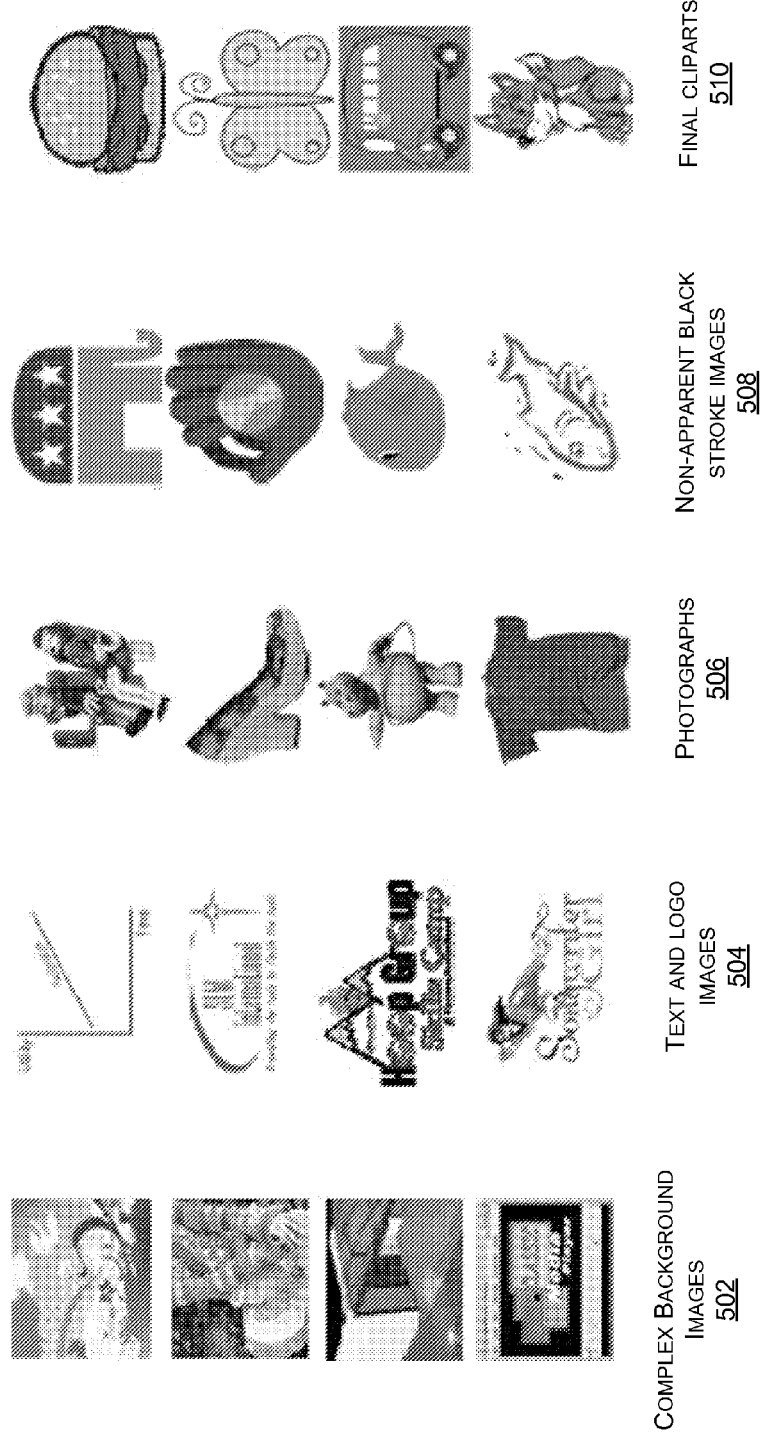
FIG. 5 illustrates some exemplary filtered images in accordance with the present disclosure.

FIG. 5 illustrates some exemplary filtered images by method 400. Picture 502 shows exemplary images with complex backgrounds that can be filtered by action 402. Picture 504 shows exemplary text and logo images filtered that can be filtered by action 404. Picture 506 shows exemplary photographs that can be filtered by action 406. Picture 508 shows exemplary images with non-apparent black strokes. Picture 510 shows exemplary clipart images that pass filtering described in method 400.

Clipart Vectorization

Above-described action 110 comprises improving the presentation of the selected clipart image after filtering. Such improvement includes, but is not limited to, vectorizing the favorite image to produce a vector representation.

Figure 6:
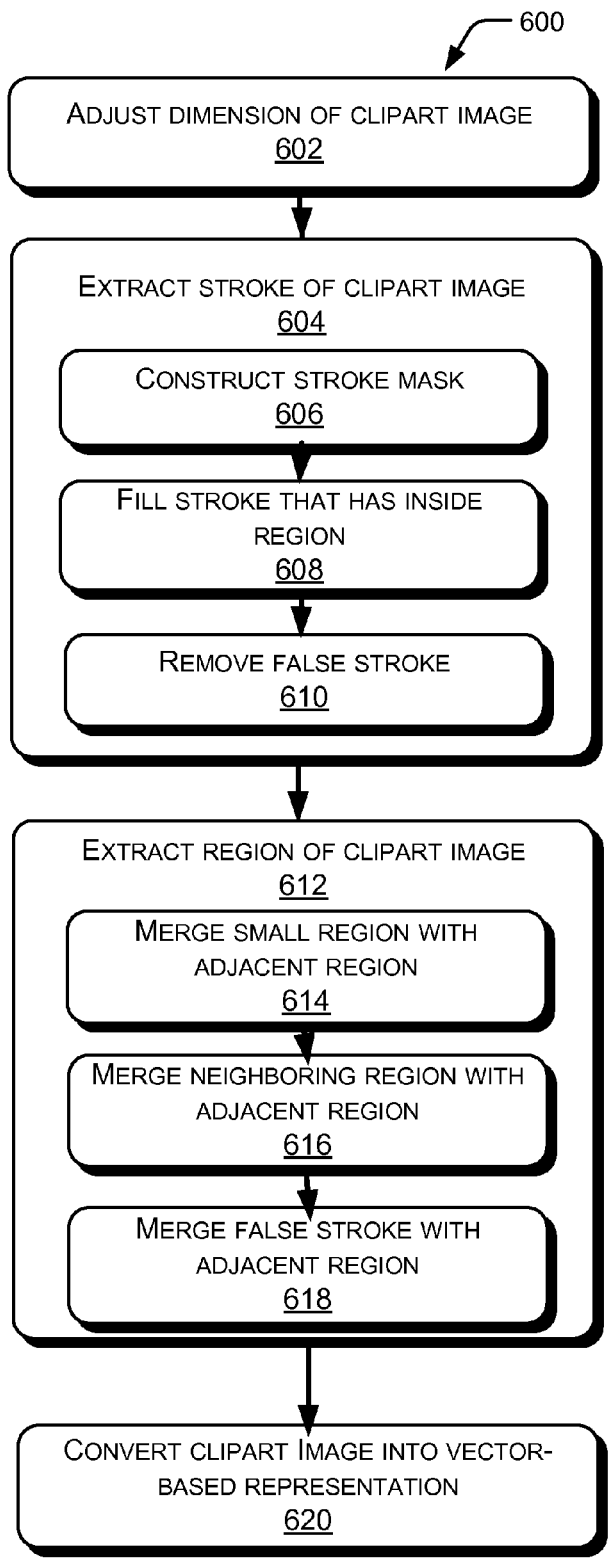
FIG. 6 illustrates an exemplary method for vectorizing a clipart image in accordance with the present disclosure.

FIG. 6 illustrates an exemplary method 600 for vectorizing the clipart image. In the example of FIG. 6, a two-step approach is used to extract a stroke and a region of the clipart image respectively. The extracted stroke and region are then converted into a vector-based representation.

This strategy not only makes a vectorization result more meaningful but also simplifies a vectorization process to make it capable of handling a low quality clipart image.

An action 602 comprises adjusting a dimension of the clipart image. Vectorization of a selected clipart images obtained after filtering may be still difficult since many online clipart images are of low quality. For example, a size of a clipart image obtained from the internet may be 200-300 pixels (dimension) such that an edge of the clipart image is usually blurry. Before vectorization of the clipart image, the clipart image can be bicubically up-sampled or down-sampled so that a maximum dimension is in a certain range. For example, such certain range can be 400-500 pixels. Bilateral filtering is then applied to reduce noise and compression artifacts using an edge-preserving smoothing filter. For instance, a spatial and range variance of the bilateral filter can be set to 1.0 and 10.0 respectively. Such an edge preserving smoothing filter can be implemented in accordance with technologies such as those described in C. Tomasi and R. Manduchi's Bilateral Filtering for Gray and Color Images, *Proceedings of the Sixth International Conference on Computer Vision*, 839-846, 1998.

Figure 7:
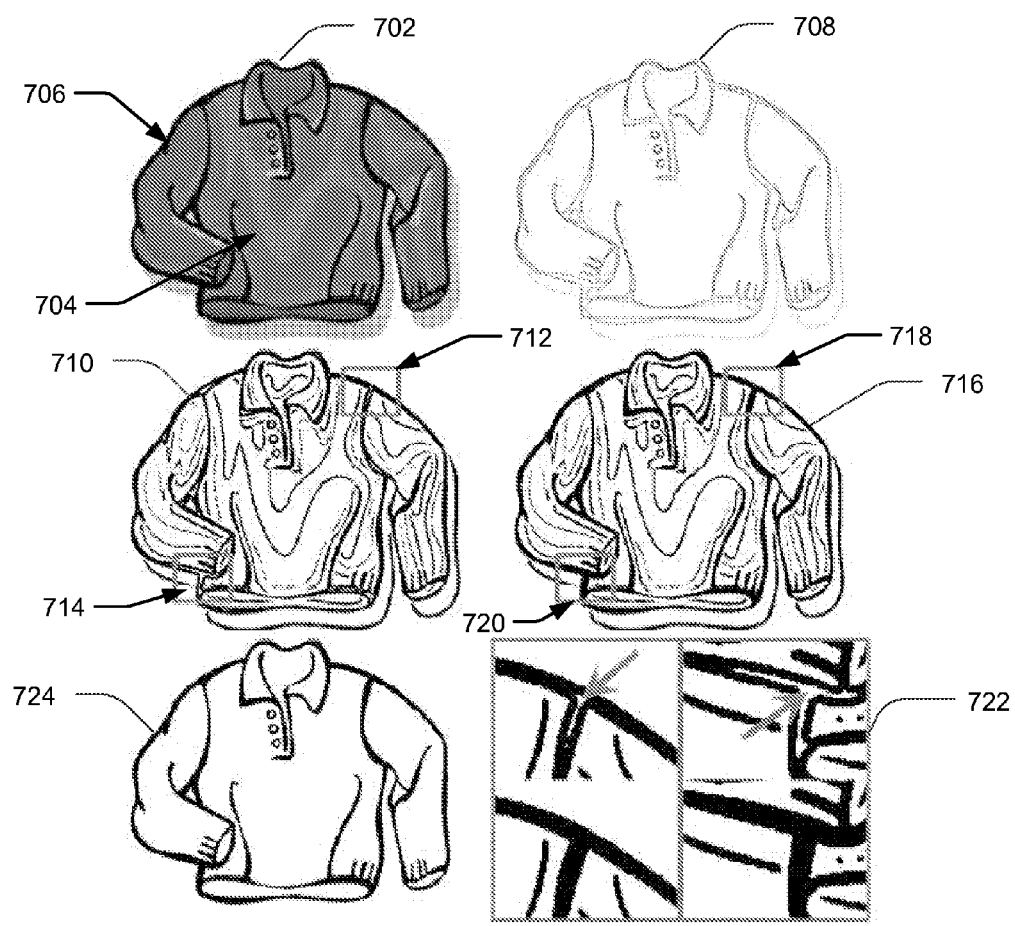
FIG. 7 illustrates an exemplary stroke extraction at different stages by using a clipart image as an example in accordance with the present disclosure.
Figure 8:
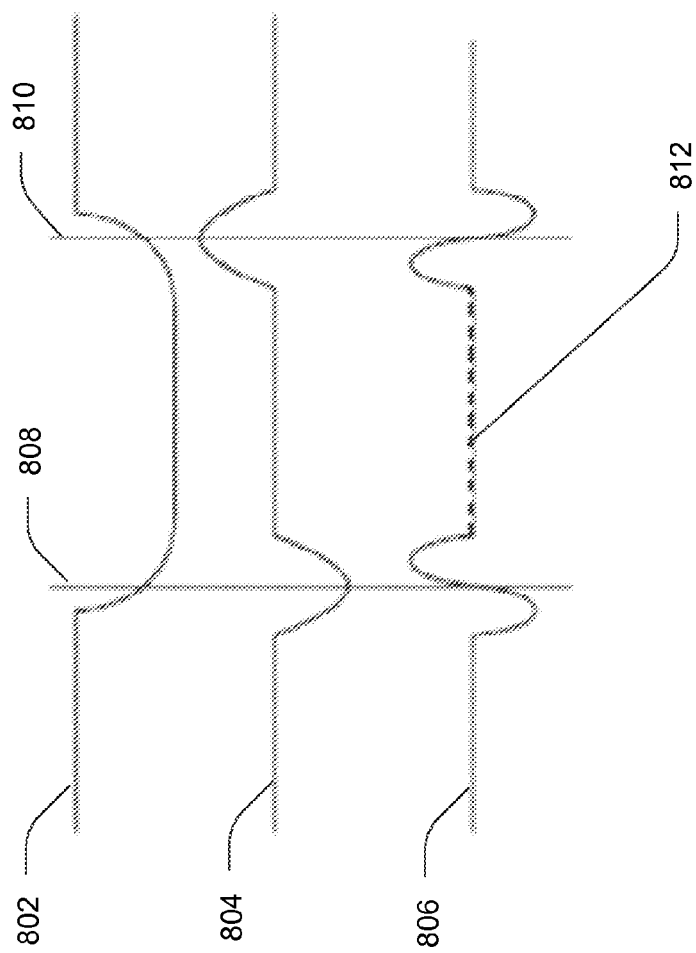
FIG. 8 shows an exemplary one-dimensional profile of a stroke and its first derivative and second derivative for stroke extraction in accordance with the present disclosure.

Action 604 comprises extracting a stroke from the clipart image. Action 604 may further comprise an action 606 comprising constructing a stroke mask, an action 608 comprising filling the stroke that has a region inside the extracted stroke, and an action 610 comprising removing a false stroke. Details of each action are illustrated below by reference to FIG. 7 and FIG. 8. FIG. 7 illustrates an exemplary stroke extraction in different stages by using a clipart image as an example. In FIG. 7, the exemplary clipart image is a jacket. FIG. 8 shows an exemplary one-dimensional profile of a stroke and its first derivative and second derivative for stroke extraction.

The clipart images usually contain two types of curvilinear structures: a step-edge and a stroke. The step-edge is a natural boundary between two regions. The stroke is an elongated area with small width and usually drawn by an artist to emphasize a structure or convey a specific artistic style. Picture 702 shows a clipart image of jacket without user's edition. An arrow 704 indicates a step-edge in picture 702 and an arrow 706 indicates a stroke in picture 702.

Action 606 comprises constructing the stroke mask. For example, edge detection can be performed by calculating a first and a second derivate of the clipart image. Action 606 may further comprise calculating a second derivative of the clipart image by convolving the second derivative of a Gaussian kernel. Picture 708 shows a second derivative of picture 702.

In the example of FIG. 8, a curve 802 shows an exemplary one-dimensional profile of a stroke. A curve 804 shows a first derivative of curve 802. A curve 806 shows a second derivative of curve 804. Lines 808 and 810 indicate a true edge position. A dash line 812 in curve 806 corresponds to an inside-stroke region. Since a stroke region is black, pixels toward the inside of the stroke region have positive second derivatives. Based on this property, a binary stroke mask can be constructed that pixels with positive second derivatives are black and the other pixels are white. Picture 710 is an obtained initial stroke mask image.

Action 608 comprises filling the stroke that has a region inside the extracted stroke. The positive response region inside the stroke is influenced by a standard derivation a (fixed to 1.1, for instance) of a Gaussian kernel. If a stroke width is larger than a kernel size, a non-positive response region (dashed line 812 at curve 806) will appear inside the stroke. Picture 710 also shows these inside-stroke regions in the stroke mask, which are indicated by arrows 712 and 714 and highlighted by a square respectively.

These regions need to be filled. Inside-stroke regions can be identified using a fact that these regions are not adjacent to the negative response regions. Specifically for each white region in the stroke mask, if none of its pixels is adjacent to an edge pixel, it is an inside-stroke region and merged to its surrounding stroke. The edge pixels can be computed from the first derivative by using Canny edge detector in accordance with technologies such as those described in Canny's A Computational Approach to Edge Detection, *IEEE Trans. Pattern Anal. March Intell*, 8, 6, 1986. Picture 716 shows the stroke mask after the stroke filling. Arrows 718 and 720 indicate that the inside-stroke regions in picture 710 are filled and are highlighted by a square respectively.

Picture 722 provides close-up views of inside-stoke regions in picture 710 at top half of picture 722 and filled stroke in picture 716 at bottom half of picture 722. Arrows in picture 722 indicate inside regions to be filled in top half of picture 722 in an enlarged view. Bottom half of picture 722 shows that these inside-stroke regions are filled in an enlarged view.

Action 610 comprises removing the false stroke. The filled stroke mask still has false strokes which are positive response regions caused by noise or a darker side of the step-edge. By exploiting the fact that an intensity of the real strokes is much darker than an intensity of the false strokes in the original image, an iterative thresholding algorithm can be applied to remove the false stroke in accordance with technologies such as those described in Sykora, et. al., Sketching cartoons by example, In 2nd Eurographics Workshop on Sketch-Based Interfaces and Modeling (SBM'05), 2005. This process is iterated until an intensity difference between the current darkest pixel and the median intensity of previous labeled regions is larger than a pre-defined threshold. The pre-defined threshold can be defined as 30, for instance. Picture 724 shows a final extracted mask after false stroke removal.

In a second step, a set of regions are extracted from a remaining part of the image. Action 612 comprises extracting a region of the clipart image. Several methods can be used. For example, a robust method based on a trapped-ball algorithm can be used. The trapped-ball algorithm takes a union of the extracted strokes and the edges detected by Canny detector as an input. The algorithm uses iterative morphological operation with decreasing radius to extract all regions. Colors of each region are fitted by a quadratic color model. However, a region extraction result by this algorithm still contains many small over-segmented regions around the boundaries, especially on low quality clipart images. To overcome this issue, three merging operations are further performed to refine the extracted region. Action 612 may further comprises action 614 to merge a small region with an adjacent region, action 616 to merge a neighboring region with the adjacent region, and action 618 to merge a false stroke with the adjacent region. Details of each action are illustrated below by reference to FIG. 9.

Figure 9:
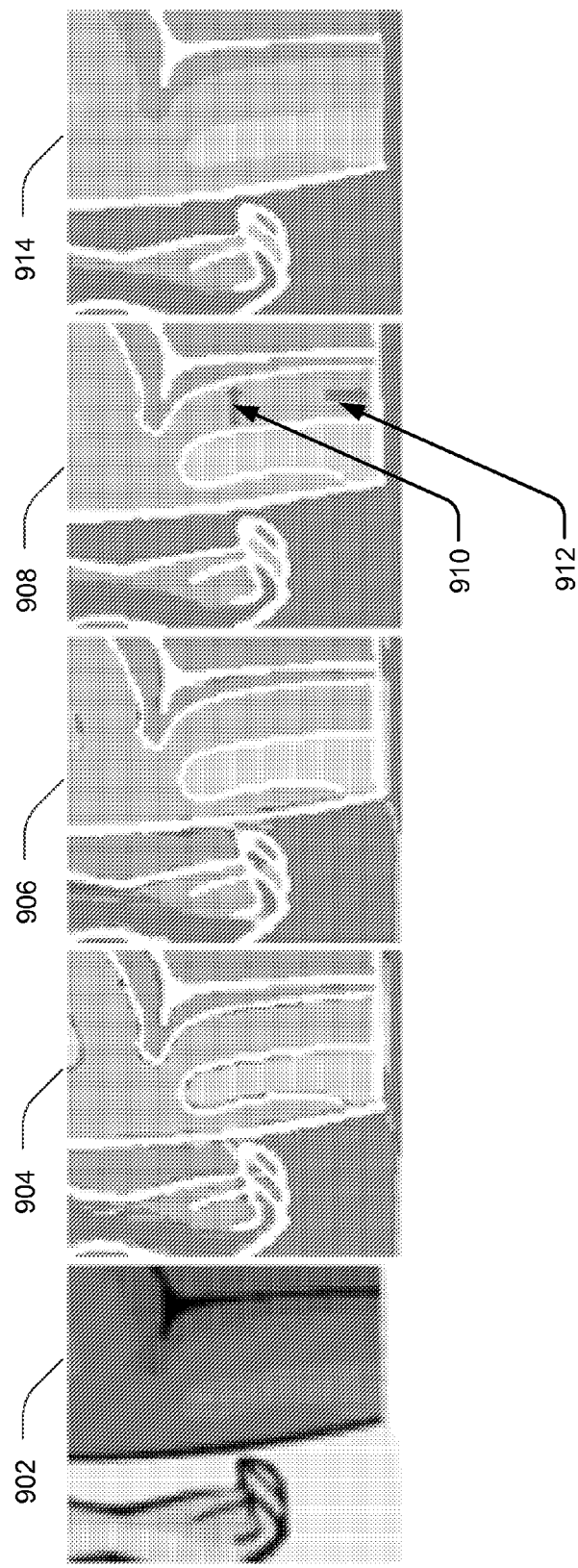
FIG. 9 illustrates an exemplary region extraction at different stages by using a clipart image as an example in accordance with the present disclosure.

FIG. 9 illustrates an exemplary region extraction at different stages by using a clipart image as an example. In FIG. 9, the exemplary clipart image is part of a human body. Picture 902 shows a clipart image of part of a human body without user's edition. Picture 904 shows an initial segmentation result by using the trapped-ball method. Regions are visualized using different colors or grayscales, and stroke pixels are shown in white.

Action 614 comprises merging the small regions. The small regions can be pre-defined, such as less than 5 pixels. The small regions on the region boundaries are typically due to the anti-aliasing effect. Each of them is merged to one of its neighboring regions with minimum fitting error. The fitting error can be computed by using a quadratic color model of each region. Picture 906 shows a result after small region merging.

Action 616 comprises merging the neighboring regions. For each neighboring region pair, a model residue of the merged region and a sum of the model residues of two regions before the merging are compared. The model residue is the difference between the image colors in each region and the fitted quadratic color model. If the difference of two residues is smaller than a threshold, such as 200,000 for example, two regions are merged. Picture 908 shows a result after merging of neighboring regions. As shown in picture 908, clean regions are obtained.

Action 618 comprises merging the false stroke. For example, picture 908 shows two false strokes 910 and 912. Because these strokes are connected with true strokes, the stroke extraction step cannot remove them. To handle this issue, action 618 may further include a two-step merging operation at a pixel level: (1) each boundary pixel of the stroke is merged to its adjacent region if its fitting error to that region is smaller than a threshold such as 30, and this process is iterated until no pixel can be merged; (2) repeat the same process for each boundary pixel of the region.

Picture 914 shows a result after these two merging operations that the two false strokes 910 and 912 in picture 908 disappear.

These extracted strokes and regions need to be converted into vector-based representations. For each stroke, its skeleton can be obtained by using a triangulation-based method that partitions the stroke regions into a set of triangles by a constrained Delaunay triangulation. Both stroke boundary and skeleton are fitted using cubic Bezier curves. At each vertex of curves, the stroke's width is estimated by a diameter of a circumscribed circle (centered at a vertex) in the stroke region.

Figure 10:
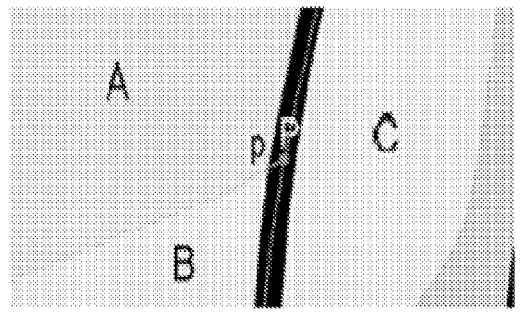
FIG. 10 shows an exemplary intersection between different regions in accordance with the present disclosure.

In order to vectorize the extracted region, two issues need to be solved. First, parts of region boundaries are defined by relevant strokes. It may cause the gaps if the stroke's style (width or type) is changed. To address this issue, skeletons of the surrounding strokes are used to replace the corresponding region boundaries. FIG. 10 shows an exemplary intersection between different regions. For an intersection point p of regions A, B and C, a correspondent P is found on skeleton of the stroke (black region). Specifically, as shown in FIG. 10, for each intersection point p between the region and the stroke, a ray is shot to the stroke to obtain the corresponding point P on the skeleton. Final region boundaries are also fitted by cubic Bezier curves.

A second issue is that some regions might have color similar to the relevant strokes. This kind of region could be incorrectly regarded as the stroke.

Figure 11:
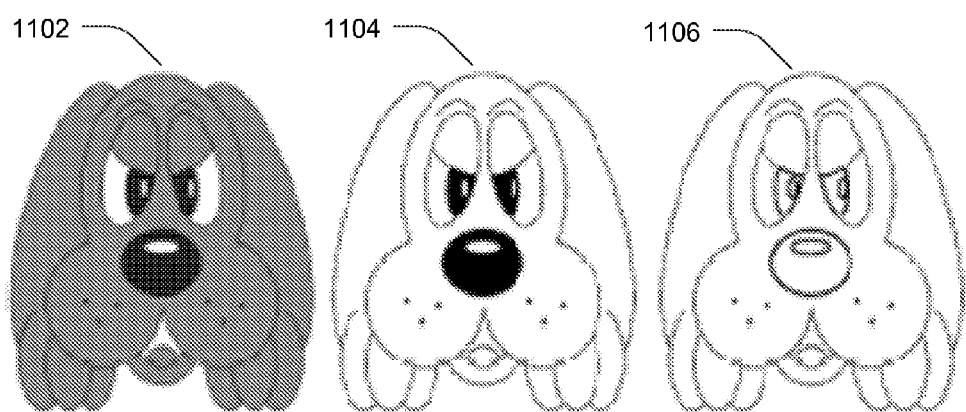
FIG. 11 illustrates an exemplary stroke and region separation by using a clipart image as an example.

FIG. 11 illustrates an exemplary stroke and region separation by using a clipart image of a dog face as an example. Picture 1102 shows a clipart image of a dog face without the user's edition. Picture 1104 shows initial strokes of picture 1102, in which regions of nose and eyes of the dog are regarded as strokes.

There is an intrinsic ambiguity in the vectorization problem because the stroke/region separation depends on the content of the image. To reduce the ambiguity, an adaptive thresholding method can be used. First, a stroke width histogram is constructed from the vectorized strokes. Second, a width threshold is found from the histogram by using a method comprises locating at the highest peak (local maximum) in the histogram, seeking the right most peak whose value is not smaller than a threshold such as 10% of the highest peak, and searching a first valley (a local minimum) on the right of that peak. This value is a stroke width threshold. If a maximal circumscribed circle of a stroke is larger than the stroke's width threshold, inside-stroke region will be removed (stored in a stroke extraction step) and vectorization is repeated. Picture 1106 shows the result after the separation.

Cartoon Recoloring

Above-described action 112 comprises changing the style of the selected clipart image. Such change of style includes, but not is limited to, recoloring the selected clipart image.

Because the above techniques output vectorized skeletons, the stroke style can be easily changed using skeletal stroke technique. However, changing colors of regions can be a frustrating process for a non-professional user because generating a group of harmonious colors is not easy to most of the people. To make the color change easy, the present disclosure provides a palette-based, quick recoloring method.

Figure 12:
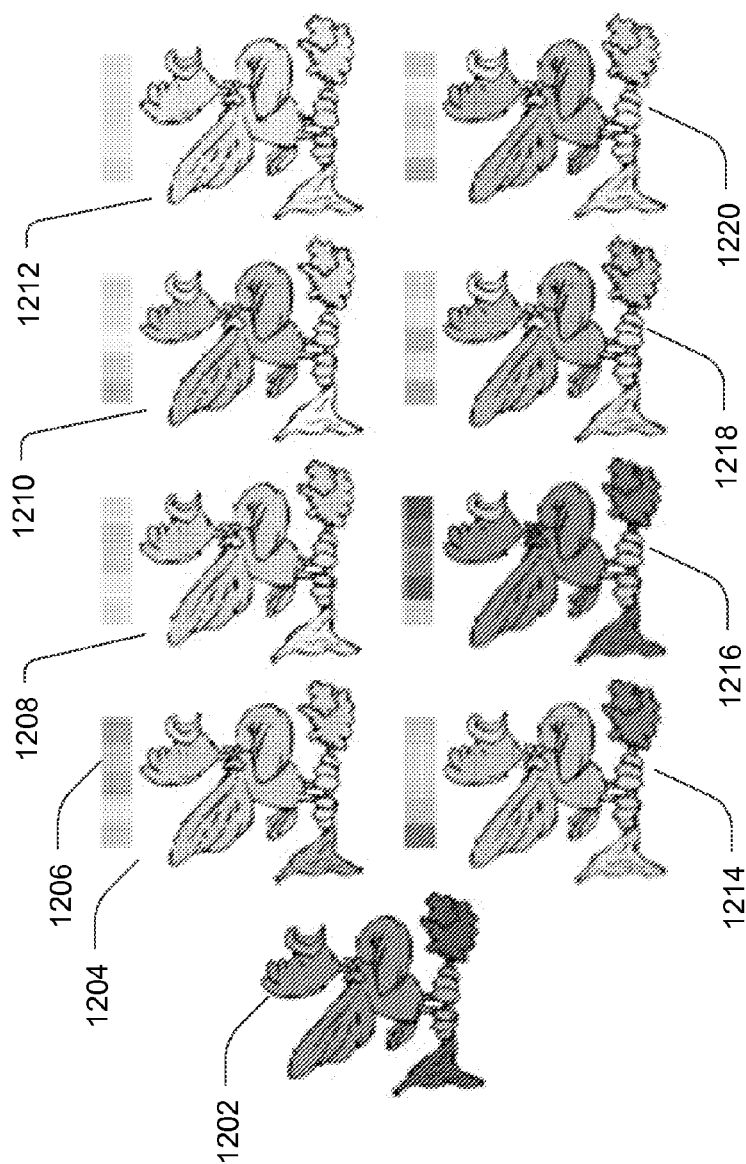
FIG. 12 shows exemplary recolored clipart images based on different color palettes in accordance with the present disclosure.

FIG. 12 shows exemplary recolored clipart images based on different color palettes. A palette is a combination of multiple colors that constitute colors of a clipart image. In the example of FIG. 12, picture 1202 shows a clipart image of a bird without the user's edition. Picture 1204 shows a recolored bird by using a color palette 1206. Color palette 1206 for recolored bird in picture 1204 and the other color palettes (numbering omitted in FIG. 12) for other recolored birds in FIG. 12 are combinations of five colors. In some other examples, the palette can contain another number of colors in the combination. The cartoon creator system can preset many different palettes so that the user only needs to select a desired palette and apply it to the clipart image. These preset palettes are pretested and provide a group of harmonious colors to the user. The user does not need artistic skills to set up colors.

The cartoon creator system can also provide an interface to the user so that the user can setup the user's own favorite palette. For example, the user can choose different number of colors provided by the cartoon creator system to form a palette.

A problem in recoloring is the color mapping process, i.e., mapping an object color to the palette colors. An object is a cartoon object or a clipart image in this embodiment. In one example, the cartoon creator system has installed thereupon the following preset rules: (1) do not map different object colors to the same palette color; (2) respect original object colors to a certain extent; and (3) object color is distinct from the background. Based on these rules, the following cost function is defined:

$$F = \Sigma_i w_i * d_1(a_i, a'_i) + d_2(a'_i, b), s \cdot t \cdot a'_i \neq a'_j \forall i,j, \quad (1)$$

where $a_i$ and $a'_i$ are an object color and its mapped palette color b is a background color, $w_i$ is an area ratio of color $a_i$ over a whole object, $d_1(a_i, a'_i)$ is a Euclidean distance between two colors $a_i$ and $a'_i$, in a color space (e.g., Lab), and $d_2(a'_i, b)$ is a Euclidean distance between two colors $a'_i$ and b in a color space (e.g., Lab).

A first term in equation (1) respects the original colors and a second term in equation (1) penalizes a mapped color that is similar to the background color. A distance $d_2(a'_i, b)$ is set to a large constant, such as 4,000, if $\|a'_i - b\| <$ a threshold such as 40; otherwise the distance is set to zero. Since the number of colors is small, the optimal mapping can be obtained by a brute-force search.

Each of pictures 1208-1220 shows a recoloring object based on a different palette presented on the respective picture (numberings of these different palettes are not shown in the FIG. 12). The cartoon creator system, by using above recoloring techniques, can recolor the cartoon objects in the clipart image and quickly have a good starting point to assist the user for developing the user's own result. The user can manually adjust the colors in the interface provided by the cartoon creator system.

An Exemplary Computing System

Figure 13:
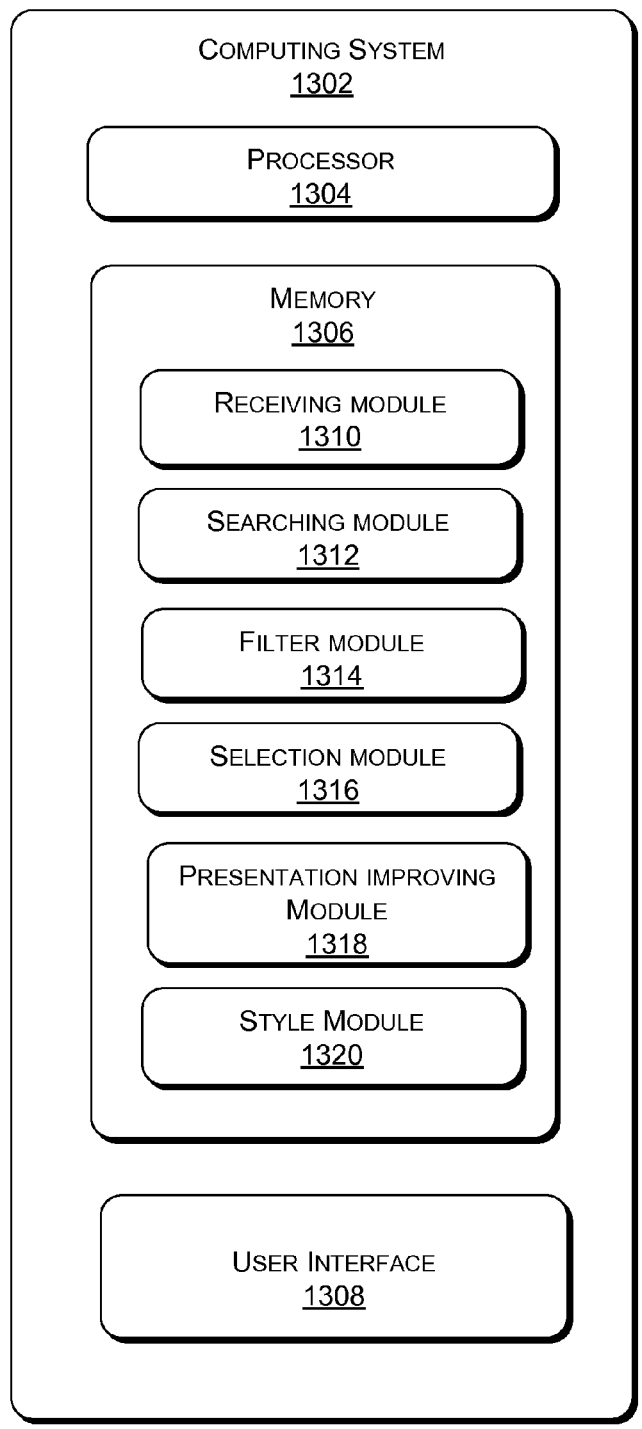
FIG. 13 illustrates an exemplary computing system in accordance with the present disclosure.

FIG. 13 illustrates an exemplary computing system 1302, which can be used to implement the techniques described herein, and which may be representative, in whole or in part, of elements described herein. Computing 1302 is an embodiment where the cartoon creator system described above can be implemented or installed.

Computing system 1302 may, but need not, be used to implement the techniques described herein. Computing system 1302 is only one example and is not intended to suggest any limitation as to the scope of use or functionality of the computer and network architectures.

The components of computing system 1302 include one or more processors 1304, and memory 1306. The computing system also includes a user interface 1308 to interact with the user.

Generally, memory 1306 contains computer-readable instructions that are accessible and executable by processor 1304. Memory 1306 may comprise a variety of computer-readable storage media. Such media can be any available media including both volatile and non-volatile storage media, removable and non-removable media, local media, remote media, optical memory, magnetic memory, electronic memory, etc. For example, such computer-readable storage media can be in a form of a hard disk, a floppy disk, a tape, a DVD, or a CD.

Any number of program modules or applications can be stored in the memory, including by way of example, an operating system, one or more applications, other program modules, and program data, a receiving module 1310, a searching module 1312, a filtering module 1314, a selection module 1316, a presentation improving module 1318, and a style module 1320.

The cartoon is composed of one or more cartoon objects. User interface 1308 is configured to interact with the user. User interface 1308 also presents a cartoon canvas to the user, which is the background of the cartoon, where the one or more cartoon objects are located. Receiving module 1310 is configured to receive a plurality of text queries from the user. A respective text query indicates a location of a respective cartoon object to be presented on the cartoon canvas, and a content of the respective cartoon object. Searching module 1312 is configured to search to provide a plurality of images corresponding to the respective text query from a database or network by using the respective text query as a search query. Filtering module 1314 is configured to obtain one or more clipart images by filtering out one or more unqualified images from the plurality of images. Selection module 1316 is configured to select a clipart image from the one or more obtained images as the respective cartoon object from the retained one or more clipart images. The user may manually select his/her favorite clipart image. Selection module 1316 may be further configured to select the other cartoon objects based on the user's selection of one cartoon object, or to select all cartoon objects based on one or more preset rules.

Presentation improving module 1318 is configured to improve a presentation of the selected clipart image. The improvement includes a vectorization of the selected clipart image. Style module 1320 is configured to change a style of one or more selected cartoon objects or the cartoon canvas.

Selection module 1316, with coordination of style module 1320, may be further configured to automatically apply a change of a style of one cartoon object to the other cartoon objects; or automatically apply a change of style of the cartoon canvas to the one or more cartoon objects.

For the sake of convenient description, the above system is functionally divided into various modules which are separately described. When implementing the disclosed system, the functions of various modules may be implemented in one or more instances of software and/or hardware.

The computing system may be used in an environment or in a configuration of universal or specialized computer systems. Examples include a personal computer, a server computer, a handheld device or a portable device, a tablet device, a multi-processor system, a microprocessor-based system, a set-up box, a programmable customer electronic device, a network PC, a small-scale computer, a large-scale computer, and a distributed computing environment including any system or device above.

In the distributed computing environment, a task is executed by remote processing devices which are connected through a communication network. In distributed computing environment, the modules may be located in storage media (which include storage devices) of local and remote computers. For example, some or all of the above modules such as searching module 1312, filtering module 1314, selection module 1316, presentation improving module 1318, and style module 1320 may locate at one or more remote processing devices. The user interacts with the remote processing devices through user interface 1308.

Some modules may be separate system and their processing results can be used by the computing system. For example, searching module 1314 can be an independent search engine such as Bing.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method comprising:
receiving a text query entered on a cartoon canvas, a location of the text query indicating a location of a cartoon object to be presented on the cartoon canvas, the text query comprising one or more keywords indicating content of the cartoon object;
searching a plurality of images based on the text query to identify one or more clipart images that include one or more black strokes and one or more regions with uniform color, the plurality of images located in a database or in one or more network accessible sites;
displaying the one or more clipart images;
receiving a selection of a clipart image from the one or more clipart images as the cartoon object for the text query;
modifying a presentation of the selected clipart image by vectorization of the selected clipart image and scaling a size of the selected clipart image; and
modifying a style of one or more selected cartoon objects or the cartoon canvas.

2. A method as recited in claim 1, wherein
the keywords are entered into a text box having a user-specified size;
a location of the text box on a cartoon canvas indicates a location of the cartoon object to be presented on the cartoon canvas, and
the keyword describes content of the cartoon object.

3. A method as recited in claim 1, wherein identifying the one or more clipart images comprises:
determining whether individual images of the plurality of images include a simple background or a complex background; and
identifying one or more images of the plurality of images as the one or more clipart images in response to determining that the one or images include the simple background.

4. A method as recited in claim 3, wherein determining whether each image of the plurality of images includes the simple background or the complex background comprises:
determining a dominant color for each corner region of each image of the plurality of images;
determining a number of corner regions of each image that share the dominant color;
determining that a particular image of the plurality of images has the simple background in response to determining that the number of corner regions of the particular image that share the dominant color satisfies a predetermined threshold; and
determining that the particular image has the complex background in response to determining that the number of corner regions of the particular image that share the dominant color does not satisfy the predetermined threshold.

5. A method as recited in claim 3, wherein searching the database or the network by using the keyword as the search query to provide the plurality of images comprises:
automatically appending another keyword to the search query, the another keyword including "cartoon" or "clipart"; and
specifying a characteristic of a respective image in the plurality of images, the characteristic including:
a size or precision; or
a style including line style or texture.

6. A method as recited in claim 1, further comprising filtering out one or more unqualified images from the plurality of images, the one or more unqualified images including at least one of:
an image of a text or a logo;
a photograph or a photorealistic computer graphic; or
an image without black strokes.

7. A method as recited in claim 1, further comprising vectorizing the clipart image.

8. A method as recited in claim 7, wherein before vectorizing the clipart image the method further comprises:
bicubically up-sampling or bicubically down-sampling the clipart image such that a maximum dimension of the clipart image is between a predetermined pixel range.

9. A method as recited in claim 7, further comprising:
before vectorizing, adjusting a dimension of the clipart image;
extracting a stroke of the clipart image;
extracting a region of the clipart image; and
converting the extracted stroke and the extracted region into a vector-based representation.

10. A method as recited in claim 9, wherein extracting the stroke of the clipart image comprises:
constructing a stroke mask;
filling the stroke that has a region inside the extracted stroke; and
removing a false stroke.

11. A method as recited in claim 9, wherein extracting the region of the clipart image further comprises one or more of:
merging a small region with an adjacent region;
merging a neighboring region with the adjacent region; or
merging a false stroke with the adjacent region.

12. A method as recited in claim 1, further comprising changing a style of the clipart image.

13. A method as recited in claim 12, wherein changing the style of the clipart image comprises:
recoloring the clipart image by using a palette comprising a combination of multiple colors.

14. A method as recited in claim 13, wherein recoloring the selected clipart image by using the palette comprises:
providing an interface to a user to select different colors to form the palette.

15. A system comprising:
one or more processors;
memory having stored thereon on instructions that are executable by the one or more processors to perform acts comprising:

presenting a cartoon canvas;
receiving a plurality of text queries that are entered on the cartoon canvas, a location of a respective text query indicating a location of a respective cartoon object to be presented on the cartoon canvas and a keyword of the respective text query indicating a content of the respective cartoon object;
searching a database or network-accessible sites to identify a plurality of images corresponding to the respective text query using the respective text query as a search query;
identifying one or more images of the plurality of images as one or more clipart images that include one or more black strokes and one or more regions with uniform color;
displaying one or more clipart images from the plurality of images;
receiving a selection of a clipart image from the one or more clipart images as the respective cartoon object for the respective text query;
modifying a presentation of the selected clipart image, the modifying including vectorization of the selected clipart image and scaling a size of the selected clipart image; and
modifying a style of one or more selected cartoon objects or the cartoon canvas.

16. A system as recited in claim 15, wherein the acts further comprise:
automatically applying a change of a style of one cartoon object to the other cartoon objects; or
automatically applying a change of style of the cartoon canvas to the one or more cartoon objects.

17. A system as recited in claim 15, wherein before vectorization of the selected clipart image the method further comprises:
bicubically up-sampling or bicubically down-sampling the selected clipart image such that a maximum dimension of the selected clipart image is between a predetermined pixel range.

18. A memory storage device including instructions that are executable by one or more processors to perform acts comprising:
presenting a cartoon canvas;
receiving a plurality of text queries that are entered on the cartoon canvas, a location of a text query indicating a location of a cartoon object to be presented on the cartoon canvas and a keyword of the text query indicating a content of the cartoon object;
searching a database or one or more network-accessible sites to identify a plurality of images corresponding to the text query using the text query as a search query;
identifying one or more images of the plurality of images as one or more clipart images that include one or more black strokes and one or more regions with uniform color;
displaying one or more clipart images from the plurality of images;
receiving a selection of a clipart image from the one or more clipart images as the cartoon object for the text query;
modifying a presentation of the selected clipart image by vectorization the selected clipart image and scaling a size of the selected clipart image; and
modifying a style of one or more selected cartoon objects or the cartoon canvas.

19. A memory storage device as recited in claim 18, wherein vectorization of the selected clipart image comprises:
adjusting a dimension of the selected clipart image;
extracting a stroke of the selected clipart image;
extracting a region of the selected clipart image; and
converting the extracted stroke and the extracted region into a vector-based representation.

20. A memory storage device as recited in claim 19, wherein:
extracting the stroke of the selected clipart image comprises:
constructing a stroke mask;
filling the stroke that has a region inside the extracted stroke; and
removing a false stroke; and
extracting the region of the selected clipart image comprises:
merging a small region with an adjacent region;
merging a neighboring region with the adjacent region; and
merging a false stroke with the adjacent region.

* * * * *